United States Patent [19]

Starr

[11] Patent Number: 4,574,350

[45] Date of Patent: Mar. 4, 1986

[54] SHARED RESOURCE LOCKING APPARATUS

[75] Inventor: Daniel C. Starr, St. Charles, Ill.

[73] Assignee: AT&T Bell Laboratories, Murray Hill, N.J.

[21] Appl. No.: 379,731

[22] Filed: May 19, 1982

[51] Int. Cl.[4] ..................... G06F 13/00; G06F 13/14
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,683,418 | 8/1972 | Martin | 444/1 |
| 3,825,903 | 7/1974 | Brown | 340/172.5 |
| 3,827,029 | 7/1974 | Schlotterer et al. | 340/172.5 |
| 4,099,243 | 7/1978 | Palumbo | 364/200 |
| 4,162,529 | 7/1979 | Suzuki et al. | 364/200 |
| 4,189,766 | 2/1980 | Horiguchi et al. | 364/200 |
| 4,214,304 | 7/1980 | Shimizu et al. | 364/200 |
| 4,399,504 | 8/1983 | Obermarck et al. | 364/200 |
| 4,435,766 | 3/1984 | Haber et al. | 364/200 |
| 4,480,307 | 10/1984 | Budde et al. | 364/200 |
| 4,488,217 | 12/1984 | Binder et al. | 364/200 |

OTHER PUBLICATIONS

J. A. Corso et al., "Task Assignment for Multiple-Processor System" *IBM Technical Disclosure Bulletin*, vol. 23, No. 11, pp. 5084-5085, (Apr. 1981).
A. N. Chandra et al., "Communication Protocol for Deadlock Detection in Computer Networks", *IBM Technical Disclosure Bulletin*, vol. 16, No. 10, pp. 3471-3481, (Mar. 1974).
Intel Corporation, "Multiprocessing Extensions for the RMX180 TM Real-Time Executive", Application Note AP-88, pp. 4-6, (1980).
V. Marathe, *Performance Evaluation at the Hardware Architecture Level and the Operating System Kernel Design Level*, pp. 63-69, Ph.D. Dissertation, Carnegie-Mellon University (1978).
W. A. Wulf, R. Levin, S. P. Harbison, *Hydra/C.mmp An Experimental Computer System*, pp. 171-184, (1981).

Primary Examiner—Eddie P. Chan
Attorney, Agent, or Firm—David Volejnicek

[57] ABSTRACT

Disclosed is a hardware lock unit for limiting concurrent use of shared resources, such as segments of a memory, by a plurality of devices, such as processors, in a program controlled system. In such a system, devices wishing to use a shared resource make a use request to the lock unit by means of a memory READ command accompanied by an address that is associated in the lock unit with that resource, which each requesting device sends to the lock unit. The requesting devices then wait for an answer, as from a slow memory. The hardware lock unit determines whether the resource is free for access by a device, or whether the resource is busy being accessed by a device. When the resource is busy, the requesting devices are caused to wait. When the resource becomes free, the lock unit hardware selects one of the requesting devices and responds to its request to grant it exclusive use of the resource. When it is finished using the resource, the device notifies the lock unit to free the resource, by means of a memory WRITE command accompanied by the address that is associated in the lock unit with that resource, which the device sends to the lock unit. Additionally, the lock unit may include hardware for preventing a lockable resource from being accessed by a device that is not its current owner, and hardware for preventing the current owner from accessing the resource more than a predetermined number of times.

40 Claims, 7 Drawing Figures

SHARED RESOURCE LOCKING APPARATUS

TECHNICAL FIELD

This invention relates to the management of shared resources in program controlled systems, and in particular to mechanisms for controlling access to such shared resources.

BACKGROUND OF THE INVENTION

A computer system may include one or more parts, such as processors, peripheral devices, device controllers, and memories, which are utilizable by other devices of the system as resources for the execution of system tasks. For example, a processor may utilize a memory section as a resource for storage of results or as a source of data and instructions; that processor may also utilize an input/output device as a resource for communicating with the outside world. Or a direct memory access (DMA) controller may utilize a memory as a resource for storing data and a peripheral device as a resource for providing data, while an I/O device may utilize a device controller as a resource for communicating with a processor or a memory.

Simultaneous use by a plurality of devices of the same resource is likely to produce errors. For example, incorrect data will be obtained from memory, or the output of a printer will be garbled. It is therefore important that such systems have means for providing an indication to devices interested in using a resource of whether that resource is free and available for use as a resource, or whether it is presently busy, acting as a resource for some device of the system and therefore unavailable to act as a resource for other devices. It is also desirable to provide therewith means of preventing a device wishing to access and utilize a busy resource from doing so until the resource becomes freed by its owner, that is, its current user.

Prior approaches to meeting these requirements have traditionally involved the use of software locks. A software lock is a program-implemented scheme of providing a user with exclusive access to a shared resource. Such software locks have commonly taken the form of semaphores, which are flags, such as register or memory word contents or flip/flop states, that indicate the busy/free states of an associated resource. Semaphore program routines test the status of the flag, generally through a test-and-set type of instruction, and prevent a device desirous of becoming a resource user from accessing the desired resource while its associated flag indicates that it is being utilized by some other user.

The prior art locking mechanisms suffer from a number of disadvantages that generally flow from their software nature. The locks commonly require a program which tests the busy/free status of the resource and either locks the free resource for use by the new user and unlocks the resource when the user no longer desires it, or makes a decision as to what to do next and then directs the device to the selected activity when the resource is busy. The program may be of substantial length, and thus may occupy a significant portion of memory, particularly when numerous locks are used and the program must be replicated for each lock.

Avoidance of replication of the lock program by incorporating it into a subroutine may alleviate the above problem, but in turn creates a new one. The subroutine calls and returns and associated trap-induced context switches during program execution take time and tie up resources, such as processors and memory, and thus adversely affect system efficiency.

If the desired resource is found to be busy, the device wishing to use the resource must periodically recheck the status of the resource to determine when the resource becomes free. This not only requires additional program text to direct the device to recheck the resource status, but also ties up other resources, such as the bus between the device and the resource, which are utilized in performing the status check.

While an interrupt may be utilized to inform the devices that a resource is free, and thus rechecking by the devices of the resource status may be avoided, interrupt-based schemes have the disadvantage that they interrupt not only all of the devices wishing to use the resource, but all other devices as well. This adversely affects system efficiency. Masking of the interrupts at devices not desiring access to the resource is not a satisfactory solution because of the software complexity which masking requires.

Furthermore, informing all of a plurality of devices desirous of accessing a formerly busy resource that it has become free creates a free-for-all race to capture the resource, which requires a repetition of the above-described activities, along with their attendant disadvantages.

There is the further possibility that in such a free-for-all, one or more devices will become locked out and will seldom or never obtain access to the resource. Neither the interrupt scheme nor the status check loop scheme provide a wholly satisfactory solution to this problem. In the above-described interrupt scheme, for example, provision of a means for selecting a device and selectively masking the interrupt to all but the selected device adds further software and complexity to the scheme.

Similarly, in the above-described status check loop scheme which forces devices to perform a program loop to periodically recheck the status of a busy resource, the provision of an arbitration scheme to select one from a plurality of devices wishing to access the shared resource requires additional software and consumes time and system resources in executing the arbitration program's instructions.

In addition to the disadvantages enumerated above, the prior art locking schemes have generally not proved wholly effective in preventing access to locked, i.e. busy, shared resources. When implemented at the level of the executing program, locks have been accessible to programmers, and therefore it has been necessary to rely on cooperation from the programmers in observing the locks, by incorporating the locks into their programs, or at least in not willfully avoiding the locks. Thus, it has been simple for programmers to bypass the locks, often simply by ignoring them. Conversely, when implemented at the level of the operating system to avoid having to rely on use by the programmers, the locks could not efficiently be associated with every attempted access to a resource like shared memory, because of the severe overhead and resulting deterioration in system performance that lock-associated traps, or interrupts, produce.

Lastly, as was mentioned above, software locks are generally constructed around the use of a test and set type of instruction. But many program controlled systems do not have this type of instruction, and therefore retrofitting of lock capability into such systems has generally been very difficult.

SUMMARY OF THE INVENTION

The present invention is directed to solving these and other disadvantages of the prior art locking schemes.

The invention provides a locking apparatus for program controlled systems which comprise a plurality of devices for accessing resources, and one or more resources coupled thereto for access by the plurality of devices, and wherein each of the devices has means for sending out either a memory READ command or a memory WRITE command and then for awaiting a response to the sent-out command before continuing operation. These means are, for example, embodied in the READ and "wait for slow memory" feature of many processors, as discussed below. According to this invention, the locking apparatus for the shared resource comprises apparatus that is responsive to a request for access to a resource, made by a device by sending the memory command to the locking apparatus and then awaiting a response before accessing the resource, for determining whether the resource may currently be accessed by a device; apparatus for selecting for access to the resource a device requesting access to the resource, and means cooperative with the determining apparatus and the selecting apparatus and responsive to the request of the selected device when the determining apparatus indicates that the resource may be accessed, for sending to the selected device a response to grant the selected device access to the resource.

Preferably, each of the devices has means for sending out both a memory READ command and a memory WRITE command, and uses the other of the two commands for signaling to the locking apparatus termination of access to a resource. The determining apparatus responds to sending of the awaited response to the selected device by indicating that the resource may not be accessed, and responds to receipt of the accesstermination signaling command by indicating that the resource may be accessed. Preferably, the determining apparatus comprises apparatus for indicating the busy and free status of the resource; the indicating apparatus is responsive to the sending of the awaited response to indicate busy status, and is responsive to the receipt of the accesstermination signaling command to indicate free status.

Advantageously, the locking apparatus further includes means for preventing access to the resource by a requesting device when the determining apparatus indicates that the resource may not be accessed. The locking apparatus may further include means for preventing a device from accessing the shared resource when the device is not in possession of the right to access the resource. The locking apparatus may also include means for counting the number of accesses made by a device to the resource and for preventing further accesses when the count exceeds a predetermined limit.

The locking apparatus frees the rest of the system from having to run a software lock program, and thereby eliminates the overhead and tie-up of system resources associated with the running of such a program. The device which is requesting access to a shared resource need only make a request for the resource and also preferably signal when it has terminated use of the resource, which functions can be accomplished with two instructions.

The locking apparatus itself performs the lock significantly faster than could a mere software lock with similar locking features. Thus the locking apparatus alleviates the system overhead associated with software locks. Furthermore, the locking apparatus substantially eliminates the other disadvantages, enumerated above, that are associated with such software.

Since the selection of a device—arbitration—for access to a shared resource is done by the locking apparatus and only the selected device is activated to gain access to the resource, the delays, complexities, and waste of resources associated with the prior art means for resolving access to the shared resource, enumerated above, are also eliminated.

Because the requesting device awaits a response to its request for resource access, the waste of resources and overhead associated with either rechecking the status of a resource or implementing an interrupt to handle this function are avoided.

Since many devices have the capability of awaiting a response, as for example the "wait for slow memory" feature found on many conventional processors, and this locking scheme requires no special locking capability from processors, generally the locking apparatus can be easily retrofitted into existing program controlled systems.

Furthermore, equipping the locking apparatus with the feature for denying access to devices not in possession of access grant to the shared resource insures that unauthorized accesses to the resource, which defeat the function of the lock, will be prevented.

These and other advantages of the present invention will become apparent from the following description of an illustrative embodiment of the invention taken together with the drawing.

DETAILED DESCRIPTION

This example illustrates the application of a locking unit constructed according to the present invention to controlling processor access to a shared memory in a multiprocessor environment.

SYSTEM

Figure 1:
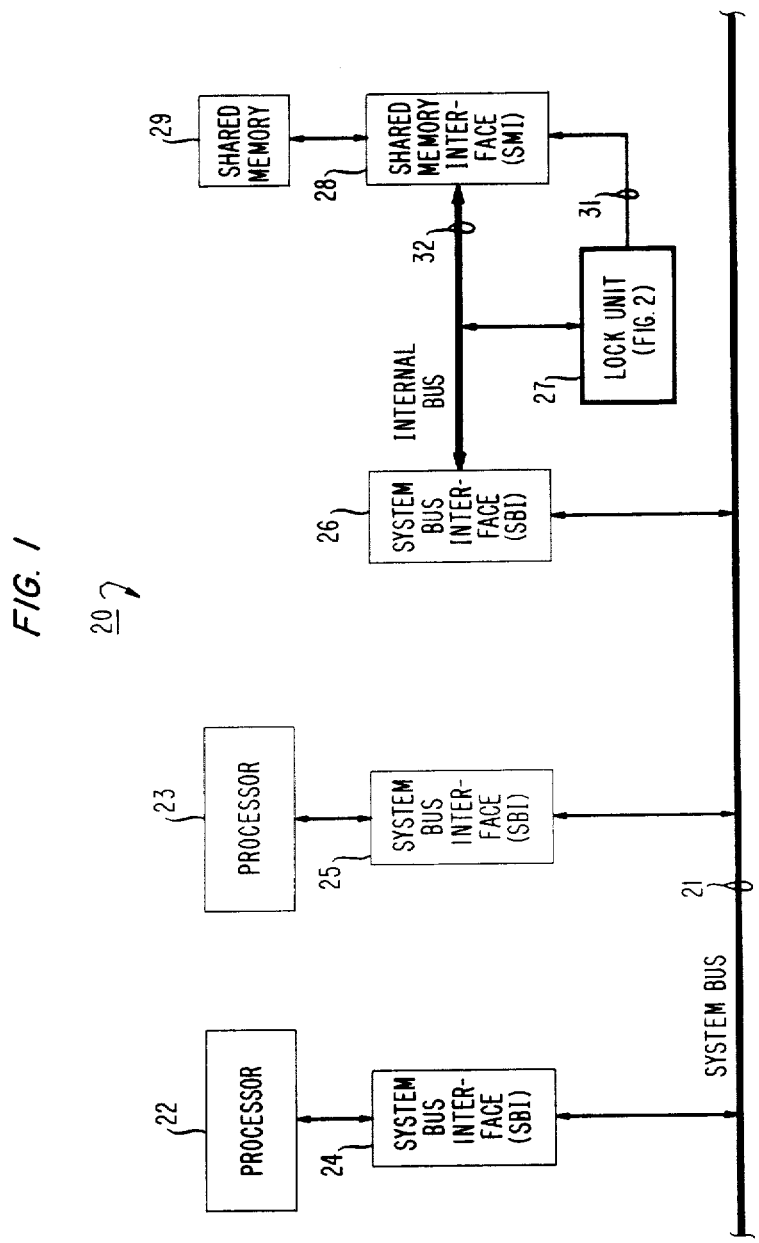
FIG. 1 is a block diagram of a portion of a programmable system which includes an embodiment of the present invention.

Turning now to FIG. 1, there is shown a portion of a multiprocessor system 20 which will serve to illustrate the principles of the invention. Shown is a portion of the system bus 21 to which are interfaced two processors 22, 23, a shared memory 29, and a lock unit 27. The system bus 21 may extend beyond the figure, and other devices, for example I/O units, communication link adapters, a bus controller, and other processors, memories, and lock units may be connected thereto. The various portions of the system 20 cooperate in performing system tasks. For example, the processors 22, and 23 perform computational tasks, obtaining their data and instructions from, and storing results in, the memory 29 which they share. Thus the memory 29 is used as a shared resource by the processors 22, 23. The lock unit 27 is associated with the shared memory 29 and controls access to the memory 29 by the processors 22, 23, placing limits on the concurrent use of the memory 29 by the two processors 22, 23. The lock unit 27 assures that while one of the processor 22, 23 is accessing a designated portion or portions of the shared memory 29, it has exclusive use of that portion of memory 29. The lock unit 27 locks the other processor 22, 23 out from accessing that designated portion of the memory 29 and forces it to wait for access until the currently accessing processor 22, 23 gives up possession of that memory portion.

The various devices are interfaced to the system bus 21 by system bus interfaces (SBI's). Thus the processors 22, 23 are interfaced by the SBIs 24, 25, respectively, while the shared memory 29 and the lock unit 27 are both interfaced by the SBI 26. The shared memory 29 is connected to the SBI 26 through a shared memory interface (SMI) 28. Communications between the SBI 26 and SMI 28 proceed over an internal bus 32 which is also tapped by the lock unit 27. Additionally, the lock unit 27 has a connection to the SMI 28 via a signal bus 31.

The processors 22 and 23, the shared memory 29, the SBIs 24, 25, and 26, the SMI 28, and the system bus 21 may be any suitable units such as are conventionally available in commerce. The particular structure of these various units will depend upon the organization and characteristics of the system 20; these factors are not of significance to this invention.

LOCK UNIT

Figure 2:
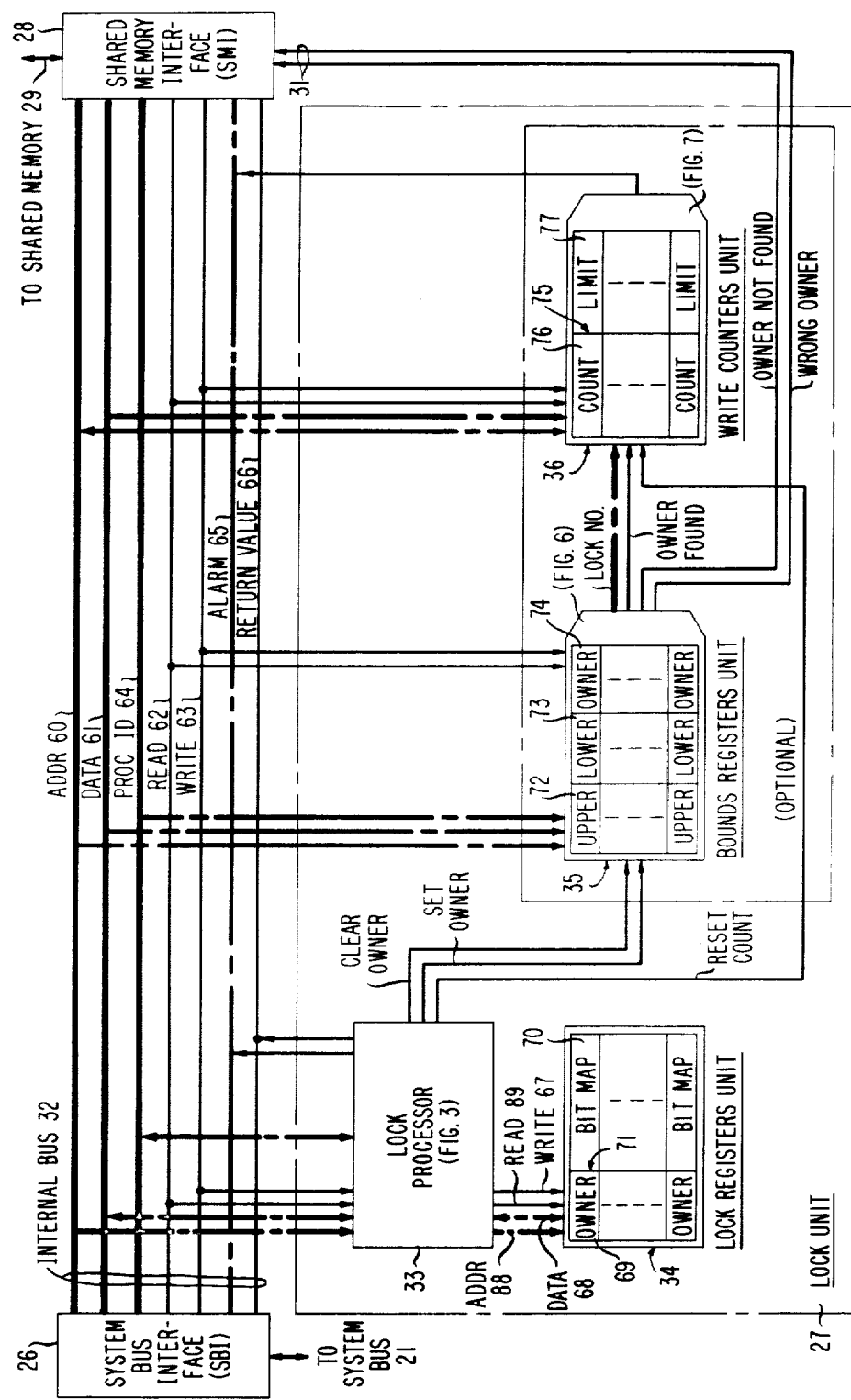
FIG. 2 is a block diagram of the lock unit of FIG. 1.

Turning now to FIG. 2, there is shown a block diagram of the lock unit 27 of FIG. 1 and details of its interconnection to the SBI 26 and the SMI 28. The internal bus 32 is comprised of a plurality of links dedicated to functions such as are commonly available on interface units. The internal bus 32 includes an address bus 60, a data bus 61, a read command line 62, a write command line 63, a processor identification (ID) bus 64, an alarm line 65, and a return value line 66.

The lock unit 27 is connected to the various links of the internal bus 32. The lock unit 27 includes a lock processor 33 which is responsible for monitoring the activity on the bus 32, for performing the locking and unlocking operations on the shared memory 29 in response to commands observed on the bus 32, and for performing the various tasks of administering the lock unit 27. Information regarding processor usage of various portions of the shared memory 29, each one of which is treated by the lock unit 27 as a separate resource, is stored in a lock registers unit 34 which is connected for communication with the lock processor 33. Additionally, the lock unit 27 includes a bounds registers unit 35 and a write counters unit 36. The bounds registers unit 35 prevents accesses to a locked portion of memory 29 by a processor 22, 23 not currently in possession of the right to access that portion, i.e., any processor 22, 23 not currently designated by the lock unit 27 as the owner of that resource, thus ensuring that the lock cannot be bypassed and defeated. The write counters unit 36 keeps count of the number of writes that a processor 22, 23 performs on a resource during a single grant of access and raises an alarm when that number exceeds a predetermined limit, thus protecting the resource from an "insane" processor. The latter two units 35, 36 may be made optional, as indicated in FIG. 2, in that they enhance the operation of the lock unit 27, but the basic lock function can be performed by the lock unit 27 without them. Operation of the units 35 and 36 becomes significant during processor accesses to the locked resource, but not during the operations of locking and unlocking the resource.

The lock registers unit 34 of the lock unit 27 is a writable memory. It may, for example, be comprised of conventional storage registers, or any other random access memory. Each portion of the shared memory 29 that is to be treated within the system 20 as a separate resource has a lock register 71 of the lock registers until 34 associated therewith. Thus the shared memory 29 may be comprised of as many portions, or resources, as there are lock registers 71 in the lock registers unit 34. A first field of a lock register 71 referred to as the owner field 69, is used to store the binary-encoded ID of the processor 22, 23 which is currently the owner of the portion of memory associated with that register 71. A second field of the lock register 71, referred to as the bit map field 70, is used to identify all processors currently requesting access to the associated memory portion. Each bit of the field 70 represents a particular processor, and the binary value of the bit indicates whether the represented processor is or is not requesting access. In the present example, each field 69, 70 is 16 bits wide: hence the bit map field 70 can represent up to 16 processors. Information on the owner and the requesting processors is written into and read out of the lock registers unit 34 under the control of the lock processor 33 which is connected for this purpose to the unit 34 by a read line 89, a write line 67, a data bus 68, and an address bus 88.

Associated with each lock register 71, and hence with each resource in the shared memory 29, is a trio of registers 72–74 in the bounds registers unit 35. The register 72 is used to store an address which represents the upper bound of the resource, while the register 73 is used to store an address which represents the lower bound of the resource. The third register, also referred to as the owner register 74, is used to store the ID of the processor 22, 23 which is the current owner of the associated resource. The bounds registers unit 35 is also any suitable writable memory. It is directly connected to, and monitors activities on, the address bus 60, the data bus 61, the read line 62, and the write line 63 of the internal bus 32. The unit 35 has CLEAR OWNER and SET OWNER input lines connecting it to the lock processor 33, and a LOCK NO. bus and an OWNER FOUND output line connecting it to the write counters unit 36. Additionally, the bounds registers unit 35 has OWNER NOT FOUND and WRONG OWNER output lines connecting it to the SMI 28. These two lines comprise the signal bus 31. The function of these lines is discussed further below. Further details of the bounds registers unit 35 are also described later herein, in reference to FIG. 6.

Also associated with each lock register 71, and hence with each resource in the shared memory 29, is a register 75 in the write counters unit 36. The register 75 is subdivided into two fields 76, 77. The field 76 is used to hold the count of the number of writes that the current owner processor has performed on the associated resource during its current access of the resource. The field 77 holds the limit value, which is the maximum number of write accesses allowed an owner to that resource in one access. The write counters unit 36 is once again any suitable writable memory. Aside from the inputs from the bounds registers unit 35, it also has a RESET COUNT control input from the lock processor 33 and is connected to the address bus 60, the data bus 61, the read line 62, the write line 63, and the alarm line 65 of the internal bus 32. The write counters units 36 is discussed in further detail in conjunction with FIG. 7.

Each set of registers 71-75 associated with a single resource has a common base address. Only the offset, comprising the least significant 3 bits of the address of the registers 71-75 varies. The offsets 000-010 are assigned to the registers 71-75, respectively. The addresses of the various sets of registers 71-75 are mapped into the address space reserved for memory in the system 20. The sets of registers 71-75 have consecutive base addresses, so that the most significant bits of the base addresses represent the address of the lock unit 27 as a whole. In the above scheme, each set of registers 71-75 represents a lock, and from the viewpoint of a processor 22,23 each lock is a set of addresses having a common base address in the units 34-36.

LOCK PROCESSOR

Figure 3:
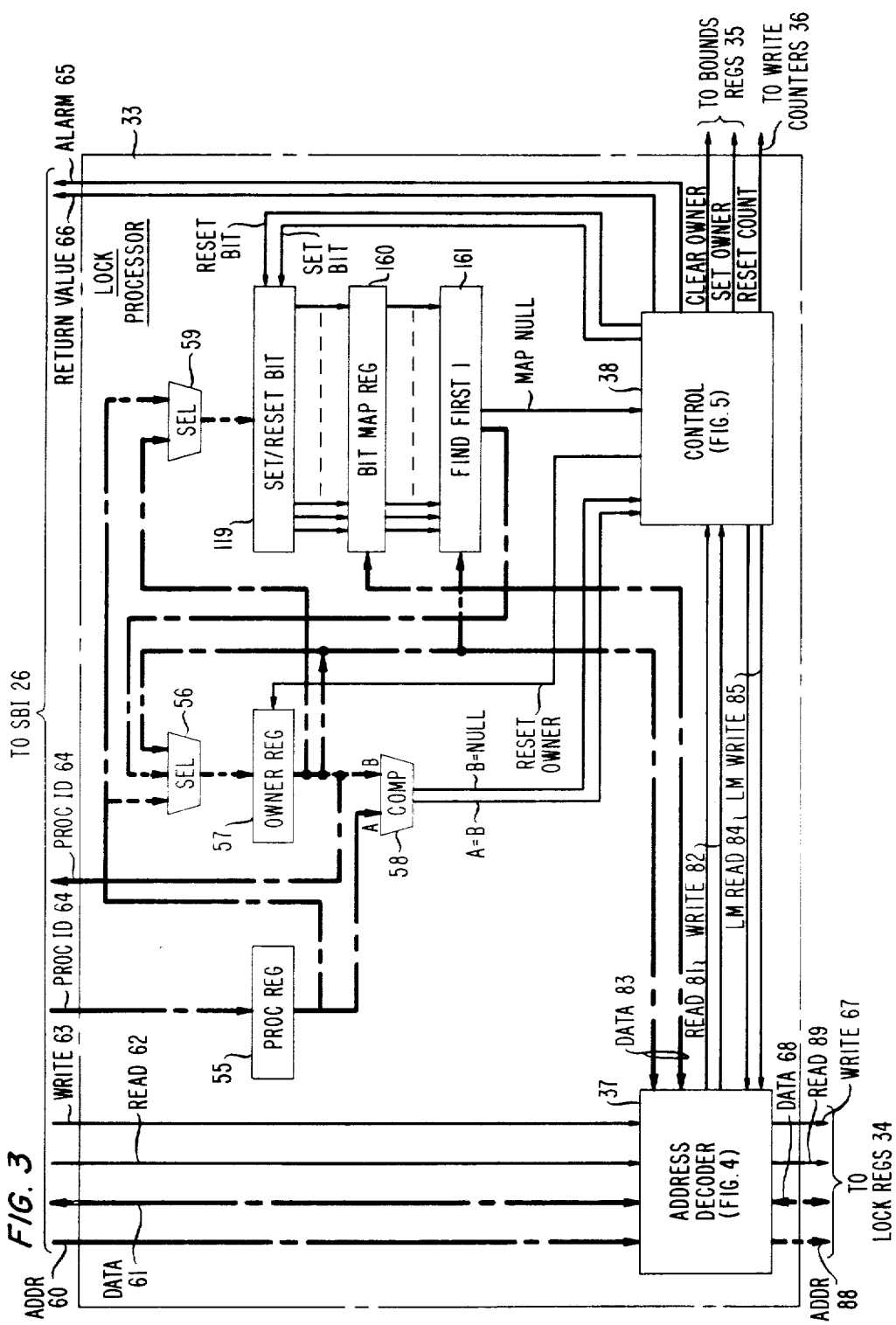
FIG. 3 is a logic diagram of the lock processor of FIG. 2.

Referring now to FIG. 3, there is shown the configuration, in block diagram form, of the lock processor 33 shown in FIG. 2. A register, referred to as a processor register 55, has its inputs connected to the processor ID bus 64 of the internal bus 32 (see FIG. 2) and temporarily holds processor ID information that passes over the bus 64. Outputs of the processor register 55 are connected to a first set of two sets of inputs of a selector 59, to a first set A of inputs of a comparator 58, and to a first set of three sets of inputs of a selector 56. The outputs of the selector 56 are connected to a register, referred to as an owner register 57, which is utilized for temporarily holding the ID of the processor 22, 23 which is the current owner of a selected resource. The contents of the owner register 57 may be reset to zero by a control circuit 38 acting over a RESET OWNER control input line. The outputs of the owner register 57 are connected to the processor ID bus 64, to the second set of inputs of the selector 59, to inputs of a "find first one" circuit 161, to the most significant bit lines of a bidirectional data bus 83, and to a second set B of inputs of the comparator 58. Outputs of the comparator 58 are input to the control circuit 38; the first output is indicative of the two sets of inputs A and B of the comparator 58 being equal, and the second output is indicative of the input B from the owner register 57 being null.

The outputs of the selector 59 are connected to inputs of a set/reset bit circuit 119. The circuit 119 translates the processor ID input from the selector 59 into the bit position which corresponds to that processor in the bit map field 70 of the lock registers 71 (see FIG. 2) discussed above. The circuit 119 has outputs each connected to a corresponding bit in a bit map register 160. In response to commands supplied by the control circuit 38 over SET BIT and RESET BIT control lines, the set/reset bit circuit 119 sets or resets the bit in the bit map register 160 which corresponds to the identified processor.

The "find first one" circuit 161 has a set of inputs each connected to a corresponding bit in the bit map register 160. Through these inputs the circuit 161 monitors the bit values of the bit map register 160. The circuit 161 is also connected for input to the output of the owner register 57 from which it obtains the processor ID of the owner of a selected resource. The circuit 161 translates the processor ID into the bit position corresponding to that processor in the bit map register 160. It then examines the status of the bit values of the bit map register 160, searching for the first bit value of 1 appearing to one side (i.e., searching either clockwise or counterclockwise) of the bit position obtained by translation from the input of the register 57. Upon finding that first bit position set to one, the circuit 161 translates that bit position into the processor ID which corresponds to that position, and outputs this ID to a second set of inputs of the selector 56. If the circuit 161 finds no bit position in the register 160 except for the starting position set to one, it outputs a signal so indicating to the control circuit 38 over a MAP NULL line.

The bit map register 160 is connected for input and output to the least significant bit lines of the data bus 83. As was mentioned above, the most significant bit lines of the bus 83 are connected to the outputs of the owner register 57; these most significant bit lines are also connected to a third set of inputs of the selector 56 for loading the owner register 57.

The circuits 119 and 161 may be conventional logic arrays. The register 160 may be a conventional register, in this example 16 bits wide to correspond to the assumed 16 bit width of the bit map field 70 of the registers 71 of the lock registers unit 34.

ADDRESS DECODER

As shown in FIG. 3, an address decoder 37 has connections to the read line 62, the write line 63, the data bus 61, and the address bus 60 of the internal bus 32. The decoder 37 connects to the control circuit 38 via a read line 81, a write line 82, an LM read line 84, and an LM write line 85. The data bus 83 connects the decoder 37 to other circuits in the lock processor 33, as was explained above. The decoder 37 also has connections to the lock registers unit 34 via a read line 89, a write line 67, a data bus 68, and an address bus 88. The decoder 37 selectively interconnects the internal bus 32, the lock registers unit 34, and the lock processor 33 internals. The address decoder 37 is essentially a switch whose position is controlled by the addresses appearing on the address bus 60.

Figure 4:
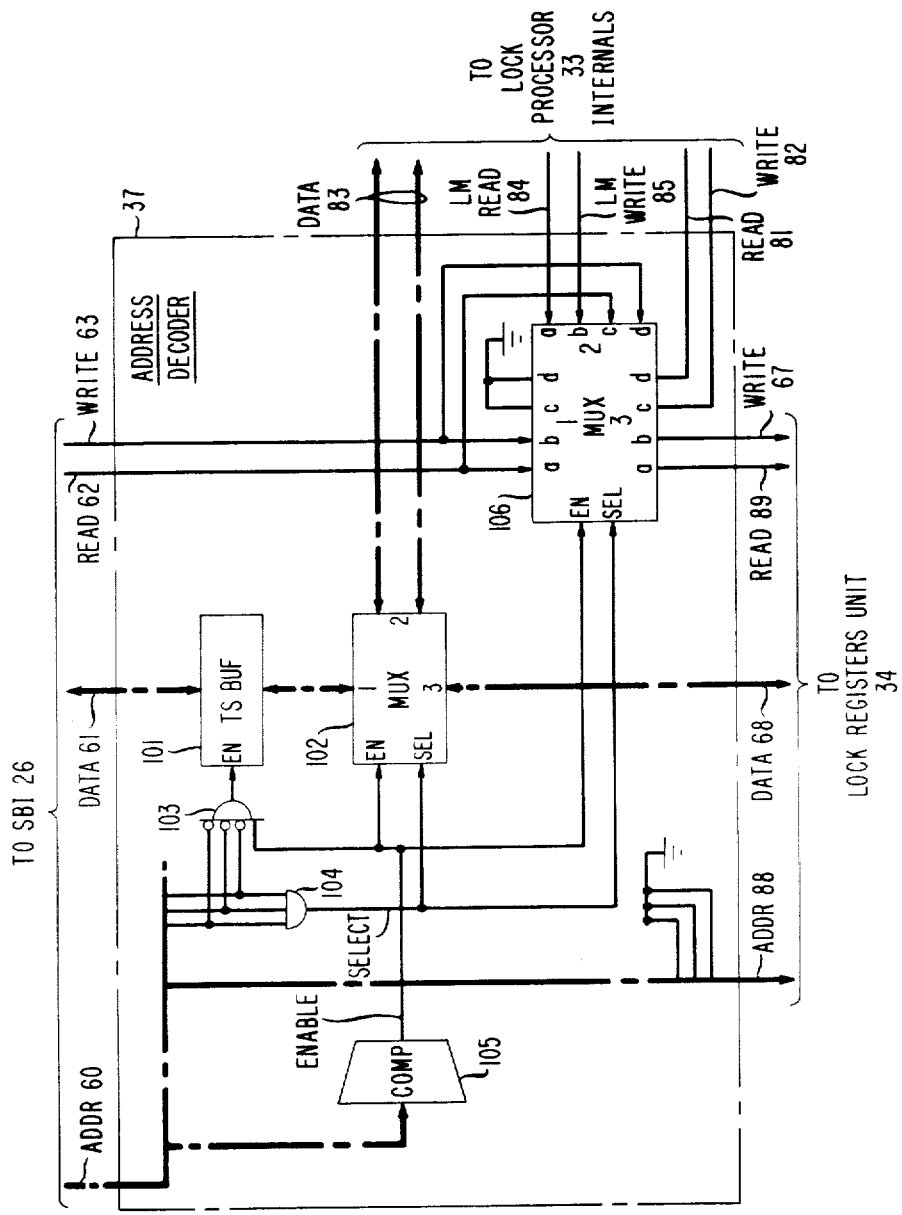
FIG. 4 is a logic diagram of the address decoder of FIG. 3.

FIG. 4 diagrams the structure of the address decoder 37. The decoder 37 includes a comparator 105 whose first set of inputs is connected to the high order bits of the address bus 60, and whose second set of inputs is set to the address of the lock unit 27. When the first set of inputs to the comparator 105 equals the second set of inputs, indicating that the lock unit 27 has been addressed over the bus 60, the comparator 105 generates an ENABLE signal over an input line to multiplexers 102 and 106, and to an AND gate 103.

Mid-order bits of the address bus 60 which represent the remainder of the base address of a lock, i.e., of a set of registers 71-75, in the lock unit 27 are connected directly to the high order bits of the address bus 88 leading to the lock registers unit 34. The low order three bits of the bus 88 are tied to ground to generate the 000 base address offset representing the address of a lock register 71 in a set of registers 71-75.

The low order three bits of the address bus 60 are connected to inputs of an AND gate 104 and to inverted inputs of the AND gate 103. The output of the gate 104 forms a SELECT control input to the multiplexers 102 and 106. The output of the gate 103 forms an ENABLE control input to a tri-state gate 101.

The tri-state gate 101 has one port connected to the data bus 61 and a second port connected to a first port of the multiplexer 102. The gate 101 enables or disables flow of data from the multiplexer 102 to the data bus 61 in response to the ENABLE input from the AND gate 103. However, the gate 101 has no effect on the flow of data from the data bus 61 to the multiplexer 102. Such tristate gates are well known in the art.

The multiplexer 102 has a second port connected to the lock processor data bus 83 and a third port connected to the data bus 68 of the lock registers unit 34. In response to is SELECT control input, the multiplexer 102 connects its third port with either its first port or its second port.

The multiplexer 106 has input A of first port and input C of a second port connected to the read line 62 of the internal bus 32. The write line 63 of the internal bus 32, is connected to input B of the first port and input D of the second port of the multiplexer 106. Inputs C and D of the first port are tied to ground, and inputs A and B of the second port are connected to the LM read line 84 and the LM write line 85, respectively, from the control circuit 38. A third port of the multiplexer 106 has its outputs A-D connected to the read line 89 and the write line 67 of the lock registers unit 34, and to the read line 81 and write line 82 of the control circuit 38, respectively. Like the multiplexer 102, the multiplexer 106 responds to its SELECT control input to connect its third port with either its first port or its second port.

When their ENABLE inputs are low, the tri-state gate 101 and the multiplexer 102 and 106 maintain their various ports disconnected from each other and thus prevent data and signals, except on the address bus 88, from passing through the address decoder 37.

When the lock unit 27 is addressed over the address bus 60, the comparator 105 recognizes this and generates the ENABLE signal which allows the tri-state gate 101 and the multiplexers 102 and 106 to respond to the state of the three low order bits of the address bus 60.

When those bits are all zero and the ENABLE line is high, indicating that a register 71 of the lock registers unit 34 is being addressed, the output of the gate 103 is high and the output of the gate 104 is low. In response to the high output of the gate 103 the tri-state gate 101 allows data to pass from the multiplexer 102 to the data bus 61. In response to the low output of the gate 104 the multiplexer 102 connects its first port with its third port, thus connecting the second port of tristate gate 101 with the data bus 68. The multiplexer 106 responds to the low output of the gate 104 by also connecting its first port with its third port, thus connecting the read and write lines 62 and 63 with the read and write lines 89 and 67, respectively. Thus a connection is established between the internal bus 32 and the lock registers unit 34.

When the three low order bits of the address bus 60 are not all zero or all one and the ENABLE line is high, generally indicating that a register of either the bounds registers unit 35 or of a write counters unit 36 is being addressed, the output of the gate 104 is low and therefore the states of the multiplexers 102 and 106 do not change from that just described. However, in such cases the output of the gate 103 is low, and the tri-state gate blocks flow of data from the multiplexer 102 to the data bus 61. Thus the connection between the internal bus 32 and the lock registers unit 34 is unidirectional only, from the bus 32 to the unit 34.

When the three low order bits of the address bus 60 are all ones and the ENABLE line is high, which indicates that a processor 22, 23 is attempting to lock or unlock a resource, the output of the gate 104 is high, and the multiplexers 102 and 106 connect their third port with their second port, thereby connecting the data bus 83 with the data bus 68, the LM read and LM write lines 84 and 95 with the read and write lines 89 and 67, respectively, and the read and write lines 62 and 63 with the read and write lines 81 and 82, respectively. Thus a data and signaling connection is made between the lock processor 33 internals and the lock registers unit 34, with an additional connection of the control circuit 38 to the read and write lines 62 and 63 of the internal bus 32.

CONTROL CIRCUIT

Returning to FIG. 3, aside from the connections already discussed, the control circuit 38 has outputs connected to the return value line 66 and the alarm line 65 of the internal bus 32, to the CLEAR OWNER and SET OWNER lines leading to the bounds registers unit 35, and to the RESET COUNT line leading to the write counters unit 36. The control circuit 38 is a logic array defined by the state diagram of FIG. 5. The diagram of FIG. 5 will be explained in conjunction with the operational description of the lock unit 27 given below.

INITIALIZATION

Initialization of the lock unit 27 is performed by one or more of the processors 22, 23 of the system 20. Preferably that task is assigned to the processor which will have been designated as the system 20 maintenance processor, for example the processor 22. The processor 22 is supplied with bounds addresses of one or more portions of the shared memory 29 that will function as lockable resources. This information will have been developed in any appropriate manner, for example by a compiler at compile time or by the operating system during system operation. Through suitable means, such as a list stored in the shared memory 29 the processor 22 selects an available lock and dedicates it to a resource, writing appropriate initial values into the selected lock. This means may be a table stored in the shared memory 29, which lists the locks, their available or dedicated status, and the identification of the resources with which the dedicated locks are associated.

The initial values of a lock's registers 71-75 are the following: a null value for the owner field 69 of the lock register 71 to indicate that no processor is currently an owner of the resource; an idle value comprising all zeros for the bit map field 70 of the lock register 71 to indicate that no processors are currently waiting to use the resource; the address of the upper bound of the resource for the upper bound register 72; the address of the lower bound of the resource for the lower bound register 73; a null value for the owner register 74, as for the register 71; and a value representative of the number of writes to be allowed to the resource between any lock and unlock operation—the limit value—for the register 75. The initial value for the register 75 is such that the limit number is written into both fields 76 and 77 of the register 75.

As was mentioned above, the registers 71-75 which comprise a single lock have a common base address and only differ in the base offset, which are the three least significant bits of the complete address. Therefore the processor 22 writes each register 71-75 of a lock separately. Through the SBI 24, the processor 22 outputs onto the system bus 21 (see FIG. 1), its ID, the address of a register, the data to be written into the register, and a memory write command. The SBI 26 detects the address on the system bus 21 and places the information from the system bus 21 onto the internal bus 32, sending the address of the register onto the address bus 60, the register data onto the data bus 61, the processor ID onto the processor ID bus 64, and a write signal onto the write line 63 (see FIG. 2).

The address decoder 37 of the lock unit 27 (see FIG. 3) responds to the address of the selected register 71 and establishes connections between the internal bus 32 and the lock registers unit 34. The signals on the data bus 61 and the write line 63 pass to the unit 34 on the data bus 68 and the write line 67, while the address of the selected register 71 passes to the unit 34 from the address bus 60 via the address bus 88. The unit 34 responds by writing the addressed lock register 71 with the initial values of the owner and bit map fields 69 and 70, respectively.

The bounds registers unit 35 responds to the addresses of the registers 72-74 and writes the initial values into the addressed registers. Likewise the write counters unit 36 responds to the address of the register 75 and writes the initial value into the addressed register 75.

During initialization, the registers of a lock respond in the same manner as storage locations of memory, such as the shared memory 29, respond within the system 20. When the registers of one lock are initialized, the processor 22 may initialize another lock for another resource. Throughout initialization, the control circuit 38 of the lock processor 33 of the lock unit 27 is in the ready state 0 (see FIG. 5).

LOCK OPERATION

A processor 22, 23 executes a lock operation on a resource by attempting to read from word 7 of the lock of that resource. For example, assuming that it is processor 23 which wishes to lock a selected resource and thereby to become its exclusive owner, the processor 23 sends out on the system bus 21 (see FIG. 1) its ID, a read command, and an address comprising the base address of the resource's lock plus an offset of seven. The "wait for slow memory feature" of the processor is utilized, and the processor 23 goes into a wait state upon issuing the read request. It remains in the wait state until a value is returned to it from the lock unit 27 in response to the read request. The SBI 26 detects the address on the system bus 21 and places the information therefrom onto the internal bus 32, sending the address onto the address bus 60, the processor ID onto the processor ID bus 64, and a read signal onto the read line 62 (see FIG. 2).

Figure 5:
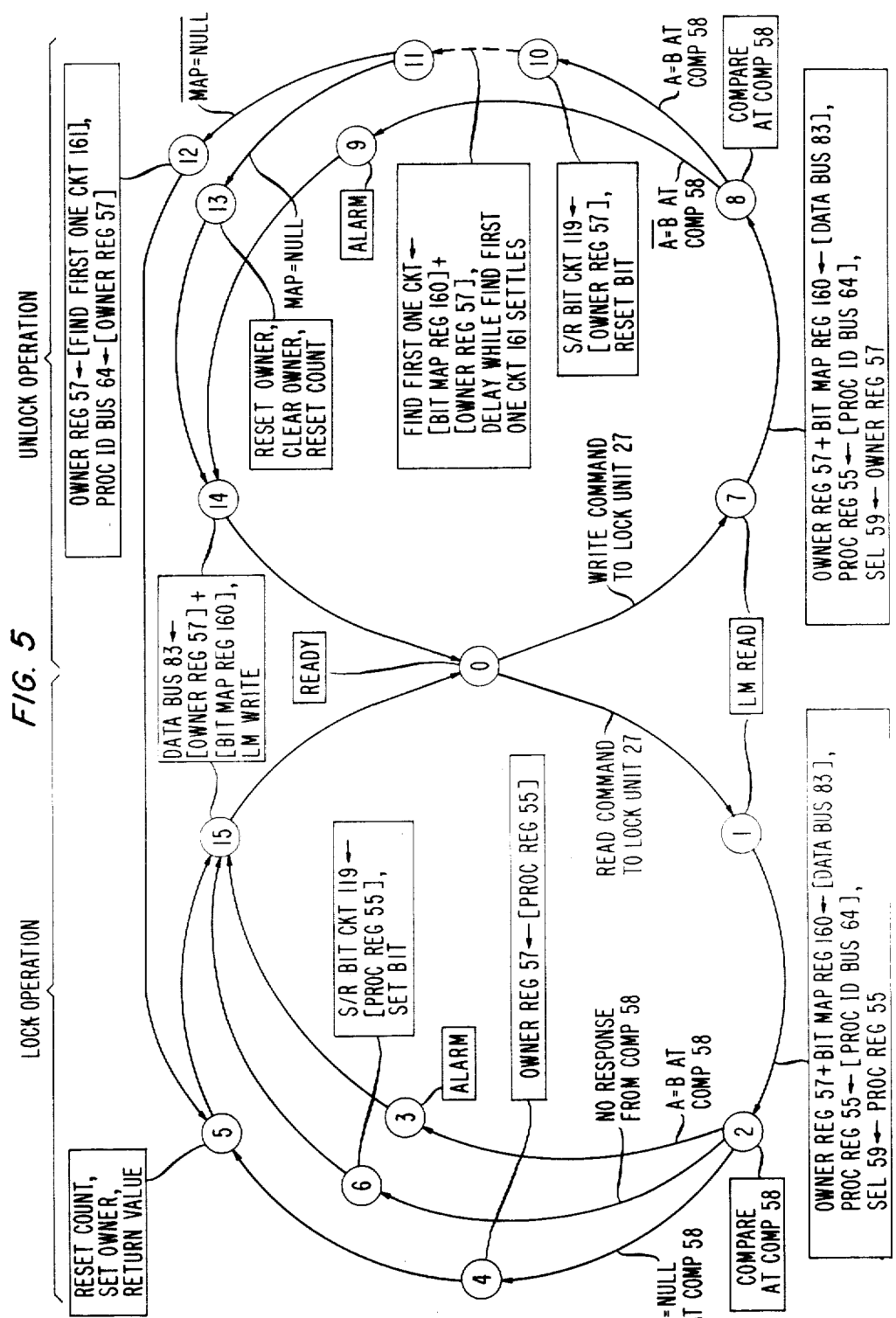
FIG. 5 is a state diagram of the control circuit of FIG. 3.

Since each lock has only four registers 71-75 with base address offsets of 0-4, respectively, the base address offset of 7 does not match any of the registers 71-75 directly, so none of them respond. However, the address decoder 37 responds to the address and connects the lock registers unit 34 with the control circuit 38 and other lock processor 33 internals. That is, the decoder 37 connects the two data buses 68 and 83, the LM read line 84 and the read line 89, and the LM write line 85 and the write line 67. The decoder 37 also connects the two read lines 62 and 81, and the two write lines 63 and 82. As shown in FIG. 5, the control circuit 38 responds to the read signal on the line 81 by asserting the LM read line 84 and making the transition from state 0 to state 1.

The lock registers unit 34 responds to the LM read signal on the read line 89 by outputting onto the data bus 68 the contents of the register 71 which is addressed by the base address present on the address bus 88. The control circuit 38 loads the contents of the owner field 69 of the register 71 from the data bus 83 into the owner register 57 through the selector 56, and loads the contents of the bit map field 70 of the register 71 from the data bus 83 into the bit map register 160. At this time, the control circuit 38 also gates the ID of the requesting processor 23 from the processor ID bus 64 into the processor register 55, and sets the selector 59 to gate the contents of the processor register 55 to the set/reset bit circuit 119. When these actions are completed the control circuit 38 goes to state 2, as shown in FIG. 5.

In the state 2, the control circuit 38 causes the comparator 58 to determine whether the contents of the processor register 55 and the owner register 57 are the same, or whether the contents of the owner register 57 are null, and to signal the result of the comparison to the control circuit 38 over the appropriate signaling line.

The default condition resulting in no signals being returned from the comparator 58 to the control circuit 38 indicates that neither of the two abovementioned conditions exist.

The contents of the registers 55 and 57 being equal means that the requesting processor 23 is already the owner of the associated resource and that it is trying to lock the resource it already owns. The control circuit 38 responds to this condition by going to state 3, as shown in FIG. 5, and asserting the alarm line 65 to signal an invalid lock attempt. The system 20 may respond to the raising of the alarm in any desired manner, such as with an interrupt.

Failure of the comparator 58 to return a signal to the control circuit 38 indicates that the requested resource has an owner and is currently busy, locked by that owner, and therefore inaccessible to the processor 23. The control circuit 38 responds to this condition by going to state 6 (see FIG. 5) to cause the selector 59 to gate the contents of the processor register 55 into the set/reset bit circuit 119 and to and assert the SET BIT line to the set/reset bit circuit 119. This causes the circuit 119 to set the bit in the bit map register 160 which corresponds to the requesting processor 23 and thus to indicate that the processor 23 is waiting to use the associated resource.

The contents of the owner register 57 being null indicate that the associated resource has no current owner and is unlocked, free to be locked and utilized by the requesting processor 23. The control circuit 38 responds to this condition by going to state 4 (see FIG. 5), causing the selector 56 to gate the contents of the processor register 55 into the owner register 57 and making the processor 23 the owner of the resource.

The control circuit 38 then goes to state 5 and asserts the return value line 66 of the internal bus 32 to cause the SBI 26 to return a value to the requesting processor 23. This processor is still identified to the SBI 26 as the processor 23 by its ID on the processor ID bus 64. The SBI 26 responds by sending over the system bus 21 to the processor 23 whatever value is present on the data bus 61 of the internal bus 32. The value sent is irrelevant, as its purpose is merely to indicate to the processor 23 that it has been given control of the requested resource.

Upon receiving the value from the lock unit 27 in response to the read request, the processor 23 leaves the wait state and continues with its operation, accessing the locked resource as its exclusion owner.

Figure 6:
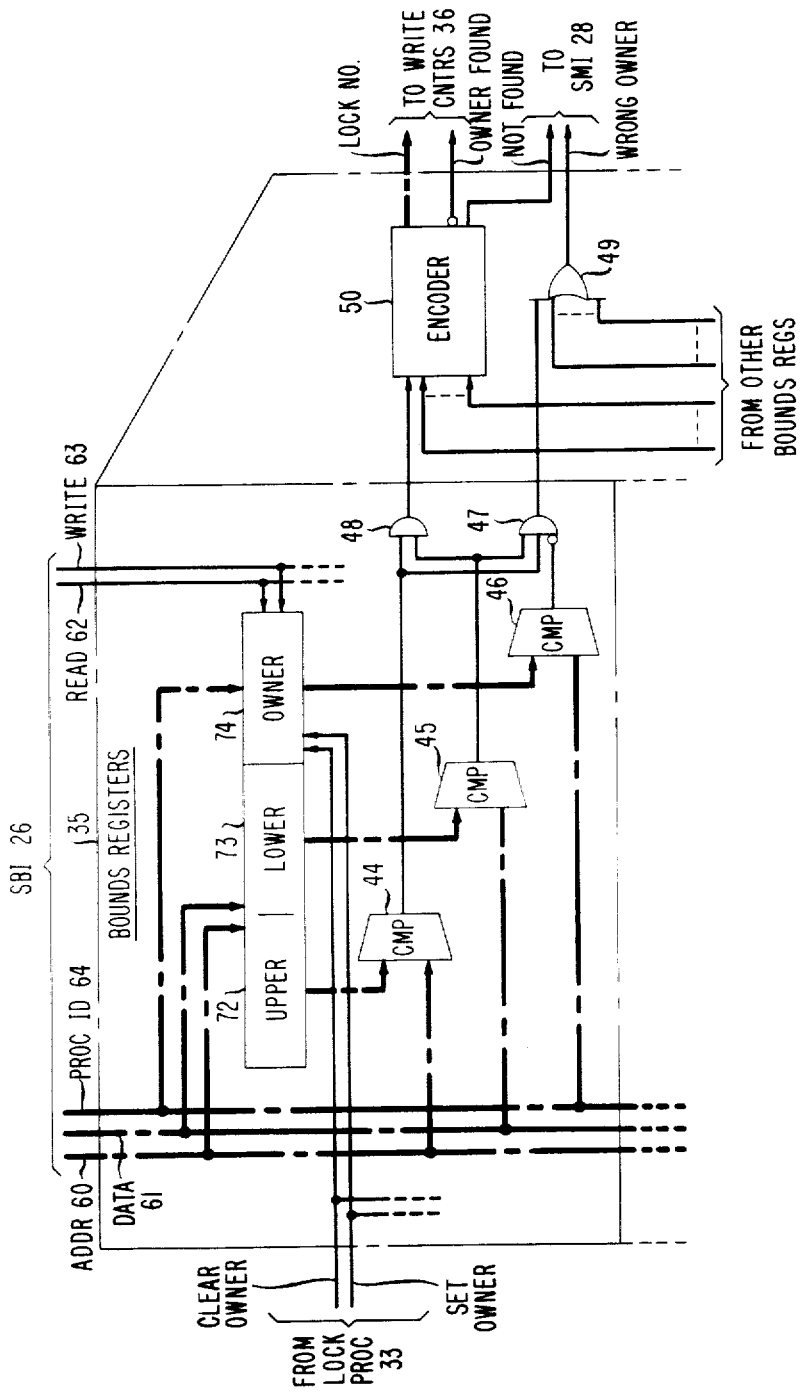
FIG. 6 is a logic diagram of the bounds registers unit of FIG. 2.

In the state 5 the control circuit 38 also asserts the SET OWNER line to the bounds registers unit 35 and the RESET COUNT line to the write counters unit 36. Referring to FIG. 6, at the bounds registers unit 35 the SET OWNER line forms a control input to all of the owner registers 74. The SET OWNER signal causes the owner register 74 which is selected by the base address on the address bus 60 to be loaded with the processor ID appearing on the processor ID bus 64, which in this case is the ID of the new owner processor 23. Thus the ID of the owner processor becomes associated with the identifying information—the upper and lower bounds—of the owned resource.

Figure 7:
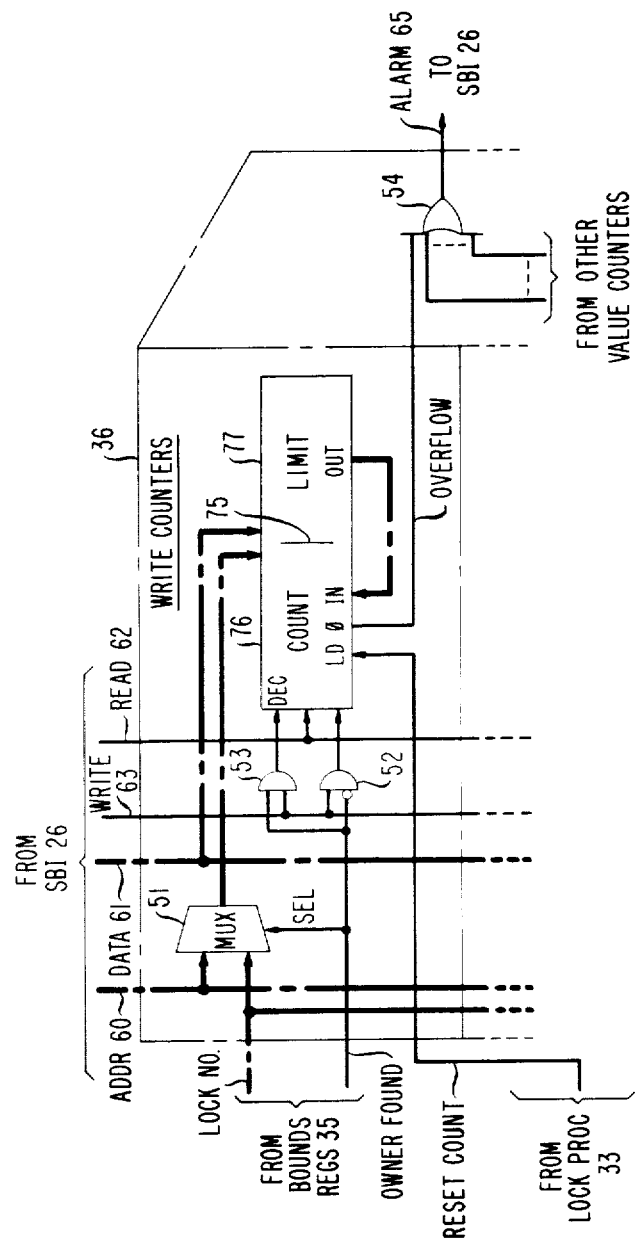
FIG. 7 is a logic diagram of the write counters unit of FIG. 2.

Referring to FIG. 7, at the write counters unit 36 the RESET COUNT line forms a load (LD) control input to all of the registers 75. The RESET COUNT signal causes the count field 76 of the register 75 which is selected by the base address on the address bus 60 to be loaded with the contents of that register's limit field 77, over a link which connects the output of the limit field portion of the register 75 to the input of the count field portion of the register 75. Thus the write count of the newly locked resource becomes reinitialized.

As shown in FIG. 5 from states 5, 3, and 6, the control circuit 38 makes a transition to state 15, asserts the LM write line 85 (see FIG. 3) to the lock registers unit 34, and causes the contents of the owner register 57 and of the bit map register 160 to be output onto the data bus 83. The lock registers unit 34 responds to the write signal on the write line 67 by loading the resource's lock register 71 with the information received over the data bus 68. The control circuit 38 then returns to its initial idle ready state 0 and the lock unit 27 is ready for its next transaction.

UNLOCK OPERATION

When the processor 23 no longer requires current access to the locked resource, it unlocks the resource and thereby frees it for use by another processor. The processor 23 executes an unlock operation on the resource by attempting to write into word 7 of the lock of that resource. The processor 23 sends onto the system bus 21 (see FIG. 1) its ID, a write command, and an address comprising the base address of the resource's lock plus on offset of seven. The SBI 26 detects the address on the system bus 21 and places information from the bus 21 on the internal bus 32.

As in the case of the read-activated lock operation discussed above, the base address offset of 7 does not match any of the registers 71-75 directly, so none of them respond. However, the address decoder 37 (see FIG. 3) again responds to the address and connects the lock registers unit 34 and the read and write lines 62 and 63 to the lock processor 33 internals.

As shown in FIG. 5, the control circuit 38 responds to the write signal on the line 82 by making the transition from state 0 to state 7 and asserting the LM read line 84 to the lock registers unit 34. As before, the lock registers unit 34 responds to the read signal on the line 81 by sending out on the data bus 68 the contents of the lock register 71 addressed by the base address present on the address bus 88. The control circuit 38 then loads the contents of the owner field 69 of the register 71 from the data bus 83 into the owner register 57 through the selector 56, and loads the contents of the bit map field 70 of the register 71 from the data bus 83 into the bit map register 160. At this time, the control circuit 38 also gates the ID of the requesting processor 23 from the processor ID bus 64 into the processor register 55, and sets the selector 59 to gate the contents of the owner register 57 to the set/reset bit circuit 119. When these actions are completed, the control circuit goes to state 8.

In the state 8, the control circuit 38 causes the comparator 58 to determine whether the contents of the processor register 55 are the same as the contents of the owner register 57. Non-equality of these contents indicates that the requesting processor 23 is not the current owner of the resource and, therefore, does not have the right to unlock that resource. The control circuit 38 responds to this condition by going to state 9, as shown in FIG. 5, and asserting the alarm line 65 of the internal bus 32 to signal on invalid lock attempt. The system 20 may respond to the raising of the alarm in any desired manner, such as an interrupt.

The contents of the register 55 and 57 being equal indicates that the requesting processor 23 is the current owner of the resource and, therefore, is properly unlocking that resource. The control circuit 38 responds to this condition by going to state 10. In state 10, the control circuit 38 causes the selector 59 to gate the contents of the owner register 57 into the set/reset bit circuit 119 and asserts the RESET BIT line to the set/reset bit circuit 119. The circuit 119 responds by clearing the bit in the bit map register 160 which corresponds to the owner processor 23, to indicate that the processor 23 is not waiting to use the associated resource.

Next, the control circuit 38 causes the contents of the bit map register 160 of the owner register 57 to be applied to the inputs of the "find first one" circuit 161 and activates the circuit 161. The circuit 161 selects the next waiting processor to receive access to the resource, by performing a rotating right search for a set bit in the bit map, starting at the bit of the previous owner processor 23, which is identified by the contents of the owner register 57. If no set bit is found by the circuit 161, that is, there are no processors waiting to use the resource and therefore all the bits in the bit map are zero, the circuit 161 asserts the MAP NULL line to the control circuit 38. In any case, the control circuit 38 waits for the circuit 161 to settle, and when the "find first one" circuit 161 has settled, the control circuit 38 assumes state 11.

If the MAP NULL line has been asserted, the control circuit 38 makes a transition from the state 11 to state 13 and asserts the RESET COUNT line to the write counters unit 36, the CLEAR OWNER line to the bounds registers unit 35, and the RESET OWNER line to the owner register 57. The effect of the RESET COUNT signal at the write counters unit 36 has been described above. Referring to FIG. 5, at the bounds registers unit 35, the CLEAR OWNER line forms a control input to all of the owner registers 74. The CLEAR OWNER signal causes the owner register 74 identified by the base address on the address bus 60 to be cleared, loaded with all zeros, to indicate that the associated resource is unlocked and free to be locked by a processor. Similarly, the effect of the RESET OWNER signal on the owner register 57 (see FIG. 3) is to cause the contents of the register 57 to be reset to all zeros.

Following the states 9 and 13, the control circuit 38 goes to state 14, where it outputs the contents of the owner register 57 and the bit map register 160 onto the data bus 83 and asserts the LM WRITE line to the lock registers unit 34. The lock registers unit 34 responds to the LM WRITE signal by loading the data sent to it by the control circuit 38 from the data bus 68 into the lock register 71 identified by the base address on the address bus 60. In the case of the transition from the state 9, this has the effect of restoring to the lock register 71 contents which it had before the unauthorized unlock operation was attempted by the processor 23. Hence, if at that time the associated resource was locked by a processor, it remains locked to that processor. In the case of the transition from the state 13, however, the effect is to load the lock register 71 with all zeros and thereby to unlock the associated resource.

Following the completion of activities in the state 14, the control circuit 38 returns to its idle ready state 0.

Returning now to a consideration of the state 11 in FIG. 5, if the MAP NULL line has not been asserted by the "find first one" circuit 161, the control circuit 38 makes a transition from the state 11 to state 12 and causes the selector 56 to gate the output of the "find first one" circuit 161 into the owner register 57. The output of the circuit 161 is the ID of the processor selected by the circuit 161 to be the new owner of the resource under consideration. At that time, control circuit 38 also causes the contents of the owner register 57 to be output onto the processor ID bus 64 to replace thereon the ID of the former owner processor 23.

From the state 12, the control circuit 38 makes a transition to the state 5 of the lock operation, to cause the resource to become properly locked to its new owner. During this lock operation, the control circuit 38 progresses through the states 5 and 15 back to state 0, in the manner described above for the lock operation.

LOCKED RESOURCE ACCESS

If a memory address is within a portion of the shared memory 29 that is lockable, that is, if it falls between the upper and lower bounds deliminating a shared resource, a processor requesting to read from or to write into that memory address will be granted permission to do so only if it has previously locked the resource containing the address and is its current owner. If a memory address lies within a portion of the shared memory that is not lockable, the address is treated as a shared read-only resource, and any processor can read it at any time, but a processor is generally not allowed to write that address.

From the viewpoint of the lock unit 27, (see FIG. 2) a memory read or a memory write operation begins with the receipt by the SBI 26 of a memory read request or a memory write request, respectively, from a processor, for example the processor 22. The address appearing on the address bus 60 of the internal bus 32 is that of a location in the shared memory 29 and not that of any word within the lock unit 27. Therefore, the lock access circuitry described above in conjunction with the initialization, lock, and unlock processes is not utilized, and the lock processor 33 remains idle.

Turning to FIG. 6, the shared memory address arrives at the bounds registers unit 35 on the address bus 60 and the ID of the requesting processor 22 arrives at the unit 35 on the processor ID bus 64. Each set of registers 72-74 in the bounds registers unit 35 has a ratio of comparators 44, 45, 46 associated therewith. The memory address enters all comparators 44 and 45 along one set of each of their inputs and the processor ID enters all comparators 46 along one set of each of their inputs. A second set of inputs of each comparator 44 is connected to the associated upper bound register 72, a second set of inputs of each comparator 45 is connected to the associated lower bound register 73, and a second set of inputs of each comparator 46 is connected to the associated owner register 74. At each set of registers 72-74, the memory address is compared with the upper address bound in the comparator 44 and with the lower address bound in the comparator 45, while the processor ID from the bus 64 is compared with the ID of the owner processor in the comparator 46.

If a comparator 44 finds that the upper bound is greater than or equal to the memory address, it sets its output high. Similarly, if a comparator 45 finds that the lower bound is less than or equal to the memory address, it sets its output high, and if a comparator 46 finds the two processor IDs being input to it to be the same, it sets its output high.

The outputs of each pair of comparators 44 and 45 are connected to the inputs of an associated AND gate 98. The output of the AND gate 48 goes high when the memory address lies within the upper and lower bounds of the associated resource. The outputs of all of the AND gates 48 are connected to inputs of an encoder circuit 50. When none of the gates 48 have a high output, the circuit 50 asserts an OWNER NOT FOUND line to the SMI 28 (see FIG. 2). When one or more of the gates 48 have a high output, the circuit 50 asserts an OWNER FOUND line to the write counters unit 36 and outputs the base address corresponding to the lock, or set of registers 72-74, whose AND gate 48 has a high output, on a LOCK NO. bus to the write counters unit 36. If more than one AND gate 48 has a high output, the encoder selects one of them for purposes of generating the lock number.

The outputs of each of a pair of comparators 44,45 are also connected to the inputs of an associated AND gate 47. An inverted input of each AND gate 47 is connected to the output of the corresponding comparator 46. Thus the output of an AND gate 47 is high only when the memory address lies between the upper and lower bounds of the associated resource but the requesting processor is not the owner of that resource. The outputs of all of the AND gates 47 are connected to inputs of an OR gate 49, whose output connects to a WRONG OWNER line leading to the SMI 28. Thus the WRONG OWNER line is asserted any time a processor tries to access a lockable resource of which it is not the current owner.

Referring now to FIG. 7, the LOCK NO. bus and the OWNER FOUND line from the bounds registers unit 35 are connected to circuitry at each register 75. As the circuitry is identical at each register 75 only the circuitry of a single register 75 is shown in FIG. 6 and explained here.

The OWNER FOUND line is connected to the select (SEL) input of a multiplexer 51. The LOCK NO. bus is connected to a first input port of the multiplexer 51, while the second port is connected to the address bus 60 of the internal bus 32. The output of the multiplexer 51 forms the address input to the register 75. The multiplexer 51 connects the address bus 60 input to its output when its SEL control input is low, and connects its LOCK NO. bus input to its output when the SEL control input is high. Thus at times when the LOCK NO. bus is low, such as during the initialization of the lock unit 27, during the locking or unlocking operation, and during a shared memory 29 access operation when the bounds registers unit 35 asserts the OWNER NOT FOUND or WRONG OWNER lines, the write counters unit 36 takes addresses from the address bus 60. Only during a shared memory 29 access operation when the bounds registers unit 35 asserts the OWNER FOUND line does the write counters unit 36 take addresses from the LOCK NO. bus.

The OWNER FOUND line is also connected to an input of an AND gate 53 and to an inverted input of an AND gate 52. The write line 63 forms a second input to the gates 53 and 52. The output of the gate 52 forms a WRITE command input to the register 75, while the output of the gate 52 is connected to a decrement (DEC) control input of the register 75. Thus when the write counters unit 36 is being addressed from the address bus 60, a signal present on the write line 63 acts as a conventional WRITE command. But when the OWNER found line has been asserted by the bounds registers unit 35, the presence of a signal on the write line causes the contents of the count field 76 of the register 75 addressed by the LOCK NO. bus signals to be decremented, to indicate that the current owner processor of the associated resource has written into that resource. If the owner processor is making a read access to the resource, the outputs of both AND gates 52 and 53 remain low and the register 75 does no change its contents. Thus, the write counters unit 36 records only write accesses to shared resources and ignores read accesses to shared resources.

If the value in the count field 76 reaches zero, indicating that the owner processor has made as many write accesses to the associated resource as it is allowed during its current ownership, an overflow signal is output by the register 75 onto an OVERFLOW line. The OVERFLOW lines of all registers 75 form inputs to an OR gate 54, whose output is connected to the alarm line 65 of the internal bus 32. Thus, when one or more OVERFLOW lines go high, the alarm line 65 goes high also. The system 20 may react to the raising of the alarm in any appropriate manner, for example with an interrupt.

Returning to a consideration of FIG. 2, during a shared memory read operation the SMI 28 ignores the OWNER NOT FOUND line. It allows the memory read transaction to occur if the WRONG OWNER line has not been asserted, and raises the alarm line 65 of the internal bus 32 if the WRONG OWNER line has been asserted by the bounds registers unit 35. However, during a shared memory write operation, the SMI 28 responds to the states of both lines of the signal bus 31, and raises the alarm line 65 if either line of the bus 31 has been asserted, allowing the memory write transaction only if neither line of the bus 31 has been asserted.

Of course, it should be understood that various changes and modifications to the illustrative embodiment described above will be apparent to those skilled in the art. For example, the lock unit may be interfaced to the system bus by its own dedicated system bus interface. Or, the lock unit can be implemented as a part of the shared memory controller. Instead of performing a rotating search to arbitrate between requesting devices, the lock unit may utilize some other arbitration scheme, for example a first-come first-served scheme, or a prioritized scheme. The lock unit may also include a deadlock detection and recovery mechanism, for example a sanity timer that limits the time for which an owner processor can keep control of a locked resource. For lock unit fault detection, two lock units may be operated in parallel and their results compared on each transaction. Or, for maintenance and error detection purposes, the lock unit may return a predetermined value to a representing processor as a response to its request to access a resource. Additionally, the system may be adapted to prevent preemption of a process while its associated processor owns a resource, to eliminate delays for other processors waiting for the resource. These and other changes and modifications can be made without departing from the spirit and the scope of the invention and without diminishing its attendant advantages. It is therefore intended that all such changes and modifications be covered by the following claims.

What is claimed is:

1. A program controlled system having a memory READ command and a memory WRITE command for reading and writing memory, respectively, by sending the command to memory, the system for selectively treating the conventional memory READ or memory WRITE command either as a memory command or as a resource locking request, the system comprising:

(A) a plurality of devices for accessing resources;

(B) at least one resource coupled to the plurality of devices for access by the plurality of devices;

(C) resource access controlling apparatus coupled to the plurality of devices for controlling access to the at least one resource by the plurality of devices;

(D) each of the plurality of devices having means for requesting from the resource access controlling apparatus access to a resource by sending one of the memory READ command and the memory WRITE command to the resource access controlling apparatus, and for awaiting a response from the resource access controlling apparatus to the request before continuing operation that includes accessing the resource;

(E) the resource access controlling apparatus including (1) means, responsive to the one of the memory READ and the memory WRITE commands sent to the apparatus, for determining whether the resource may currently be accessed by a requesting device, (2) means, responsive to one or more of the one of the memory READ and the memory WRITE commands sent to the apparatus, for selecting for access to the resource a device requesting access to the resource, and (3) means, cooperative with the determining means and the selecting means and responsive to the one of the memory READ and the memory WRITE commands sent to the apparatus by the selected device, for sending to the selected device a response when the determining means indicate that the resource may be accessed, to grant the selected device exclusive use of the resource.

2. The system of claim 1 wherein each of the plurality of devices further have:

means for signaling to the resource access controlling apparatus termination of access to a resource by sending the other of the memory READ command and the memory WRITE command to the resource access controlling apparatus.

3. The system of claim 2 wherein the determining means comprise means responsive to the means for sending a response for indicating upon the sending of the response that the resource may not be accessed by a requesting device, and further responsive to the means for signaling termination of access for indicating upon receipt of signaling of termination of access that the resource may be accessed by a requesting device.

4. The system of claim 1 further comprising:
means associated with the resource access controlling apparatus for preventing access to the resource by a requesting device when the determining means indicate that the resource may not be accessed.

5. The system of claim 1 or 4 further comprising:
means associated with the resource access controlling apparatus for preventing access to the resource by a device not having the grant of access to the resource.

6. The system of claim 1 further comprising:
means associated with the resource access controlling apparatus for counting the accesses by a device to the resource and for preventing further accesses by that device when the count exceeds a predetermined limit.

7. A program controlled system having a memory READ command and a memory WRITE command for reading and writing memory, respectively, by sending the command to memory, the system for selectively treating the conventional memory READ and memory WRITE commands either as memory commands or as resource locking and unlocking requests, respectively, the system comprising:
(A) a plurality of devices for using resources;
(B) at least one resource coupled to the plurality of devices for being shared by the devices;
(C) resource use limiting apparatus coupled to the plurality of devices for limiting concurrent use of the at least one resource by a plurality of the devices;
(D) each of the plurality of devices having means for sending a memory READ command identifying a resource to the resource use limiting apparatus thereby to request exclusive use of the identified resource and for awaiting a response to the READ command from the resource use limiting apparatus before continuing operation that includes using the identified resource, and further having means for sending a memory WRITE command identifying the resource to the resource use limiting apparatus to signal termination by the device of use of the identified resource;
(E) the resource use limiting apparatus including
  (1) means for indicating the busy and free status of each of the at least one resource,
  (2) means, responsive to receipt of a memory READ command identifying a resource, for selecting for use of the identified resource one device requesting use of the identified resource,
  (3) means, coupled to the indicating means and to the selecting means, for sending a response to the selected device when the indicating means indicate that the status of the identified resource is free status, to grant the selected device exclusive use of the identified resource,
  (4) means, responsive to sending of the response by the means for sending a response, for causing the indicating means to indicate busy status for the identified resource, and
  (5) means, responsive to receipt from the selected device of a memory WRITE command identifying the resource, for causing the indicating means to indicate free status for the identified resource.

8. The system of claim 7 wherein the resource use limiting apparatus further comprises:
means for preventing use of a resource by a device not having the grant of use of the resource.

9. The system of claim 8 wherein the use preventing means comprise:
means for detecting attempted use of the resource by a device;
means responsive to the detecting means for determining whether the attempting device has the grant of use of the resource; and
means responsive to the grant determining means for signaling to the resource that the attempting device does not have the grant of use.

10. The system of claim 7 wherein the resource use limiting apparatus further comprises:
means for counting this number of times a device uses the resource while having the grant of use, and for signaling to the resource when the count exceeds a predetermined limit.

11. The system of claim 10 wherein the use of a resource includes a use of a first type and a use of a second type, and wherein the counting means only count the number of uses of the first type.

12. The system of claim 7 wherein the plurality of devices include at least one processor.

13. The system of claim 7 wherein the at least one shared resource includes a memory.

14. The system of claim 13 wherein
the means for sending a memory READ command identifying a resource comprise means for sending to the resource use limiting apparatus a memory READ command and address, which address is associated by the resource use limiting apparatus with the resource, to request exclusive use of the resource, and for sending to the memory a memory READ command and a memory address to read the memory, wherein
the means for sending a memory WRITE command identifying the resource comprise means for sending to the resource use limiting apparatus a memory WRITE command and the address associated by the resource use limiting apparatus with the resource to signal termination of use of the resource, and for sending to the memory a memory WRITE command and a memory address to write the memory, and wherein
the concurrent use limiting apparatus responds to devices, in response to memory READ and WRITE commands sent thereto, in like manner as the memory responds to devices, in response to memory READ and WRITE commands sent thereto.

15. The system of claim 7 wherein the status indicating means include:
at least one storage means, each associated with one resource for indicating the device having the grant of use of the associated resource.

16. The system of claim 15 wherein the means for sending a response to the selected device include:

means for sending a signal to the selected device when the storage means associated with the identified resource indicate no device.

17. The system of claim 7 wherein the device selecting means include:
   at least one storage means, each associated with one resource for indicating the devices requesting use of the associated resource, and
   means for selecting a device from devices indicated by the storage means associated with a resource for using the associated resource.

18. A program controlled system having a memory READ command and a memory WRITE command for reading and writing memory, respectively, by sending the command to memory, the system for selectively treating the conventional memory READ and memory WRITE commands either as memory commands or as resource locking and unlocking requests, respectively, the system comprising:
   (A) a plurality of identifiable devices, each including means for sending a memory READ command accompanied by an address and for causing the device to wait for a response to the sent READ command before continuing operation, and each further including means for sending a memory WRITE command accompanied by an address;
   (B) a memory coupled to the plurality of devices for use by the plurality of devices; and
   (C) an addressable locking apparatus associated with the memory, coupled to the plurality of devices, and responsive to certain addresses reserved for memory in the system, for limiting concurrent use by a plurlity of the devices of a set of memory portions comprising at least one portion of the memory, including
      (1) first means associated with a memory portion included in the set for identifying a device having the right to currently use the memory portion,
      (2) second means associated with the memory portion for identifying devices requesting use of the memory portion,
      (3) means, responsive to a sent memory READ command accompanied by a certain address, for causing the second means to identify the device that is sending the command and the certain address to request use of the memory portion,
      (4) means, coupled to the second means, for selecting a device from devices identified by the second means,
      (5) means for sending a response to the memory READ command of the selected device when the first means do not identify a device, to grant the selected device the right to currently exclusively use the memory portion,
      (6) means, responsive to the response sent by the response-sending means to the selected device, for causing the first means to identify the selected device, and
      (7) means, responsive to a sent memory WRITE command accompanied by the certain address, sent by the device identified by the first means to signal its termination of use of the memory portion, for causing the first means to cease identifying the device.

19. The system of claim 18 further comprising:
   third means for storing the bounds of the memory portion;
   means, responsive to sending of a memory READ or WRITE command accompanied by an address, for comparing the address accompanying the command against the bounds stored in the third means and for comparing identity of the device sending the command and address against identity of the device identified by the first means; and
   means for signaling the memory when the comparing means indicate that the address lies within the bounds and that the compared identities are not the same.

20. The system of claim 19 further comprising:
   resettable count storage means associated with the memory portion;
   means, responsive to sending of a memory WRITE command accompanied by an address, for updating the count storage means when the comparing means indicate that the address lies within the bounds and that the compared identities are the same;
   means for signaling the memory when the count storage means reach a predetermined count; and
   means, responsive to the response sent by the responding means to the selected device, for resetting the count storage means to an initial value.

21. A resource lock for a program controlled system which has a memory READ command for reading memory by sending the command to memory, and which includes a plurality of devices for accessing resources, at least one resource applied to the plurality of devices for access by the plurality of devices, and each of the plurality of devices having means for sending a memory READ command and for awaiting a response to a sent memory READ command before continuing operation, the lock enabling the system to selectively treat the memory READ command either as a memory command or as a resource locking request, the lock comprising:
   apparatus for coupling to the plurality of devices to control access to the at least one resource by the plurality of devices, including
      (1) means, responsive to a request for access to a resource made by a device by sending the memory READ command to the apparatus, for determining whether the resource may currently be accessed by a requesting device,
      (2) means, responsive to one or more of the memory READ commands sent to the apparatus, for selecting for access to the resource a device requesting access to the resource, and
      (3) means, cooperative with the determining means and the selecting means and responsive to the memory READ command sent to the apparatus by the selected device, for sending to the selected device a response to the memory READ command when the determining means indicate that the resource may be accessed, to grant the selected device exclusive use of the resource.

22. A resource lock for a program controlled system which has a memory READ command and a memory WRITE command for reading and writing memory, respectively, by sending the command to memory, and which includes a plurality of devices for accessing resources, at least one resource coupled to the plurality of devices for access by the plurality of devices, and each of the plurality of devices having means for sending a memory READ command and a memory WRITE command and for awaiting a response to a sent one of a memory READ command and a memory WRITE command before continuing operation, the lock enabling the system to selectively treat the conventional memory READ or memory WRITE command either as a memory command or as a resource locking request, the lock comprising:

apparatus for coupling to the plurality of devices to control access to the at least one resource by the plurality of devices, including (1) means, responsive to a request for access to a resource made by a device by sending one of the memory READ command and the memory WRITE command to the apparatus and awaiting a response before continuing operation that includes accessing the resource, for determining whether the resource may currently be accessed by a device, (2) means, responsive to one or more of the one of the memory READ and the memory WRITE commands sent to the apparatus, for selecting for access to the resource a device requesting access to the resource, and (3) means, cooperative with the determining means and the selecting means and responsive to the one of the memory READ and the memory WRITE commands sent to the apparatus by the selected device, for sending to the selected device a response to the one of the memory READ and the memory WRITE commands when the determining means indicate that the resource may be accessed, to grant the selected device exclusive use of the resource.

23. The lock of claim 21 or 22 further comprising:
means associated with the apparatus for preventing access to the resource by a requesting device when the determining means indicate that the resource may not be accessed.

24. The lock of claim 21 or 22 further comprising:
means associated with the apparatus for preventing access to the resource by a device not having the grant of access to the resource.

25. The lock of claim 21 or 22 further comprising:
means associated with the apparatus for counting the accesses by a device to the resource and for preventing further accesses by that device when the count exceeds a predetermined limit.

26. A resource lock for a program controlled system which has a memory READ command and a memory WRITE command for reading and writing memory, respectively, by sending the command to memory, and which includes a plurality of devices for using resources, at least one resource coupled to the plurality of devices for being shared by the devices, each of the plurality of devices having means for sending a memory READ command and a memory WRITE command and for causing the device to wait for a response to a sent memory READ command before continuing operation, the lock enabling the system to selectively treat the conventional memory READ and memory WRITE commands either as memory commands or as resource locking and unlocking requests, respectively, the lock comprising:

apparatus for coupling to the plurality of devices to limit concurrent use of the at least one resource by a plurality of the devices, including (1) means for indicating the busy and free status of each of the at least one resource, (2) means, responsive to receipt of a memory READ command identifying a resource, sent by a device to the apparatus to request exclusive use of the identified resource, for selecting for use of the identified resource one device requesting use of the identified resource, (3) means, coupled to the indicating means and to the selecting means, for sending a response to the selected device when the indicating means indicate that the status of the identified resource is free status, to grant the selected device exclusive use of the identified resource, (4) means, responsive to sending of the response by the means for sending a response, for causing the indicating means to indicate busy status for the identified resource, and (5) means, responsive to receipt of a memory WRITE command identifying the resource, sent by the selected device to the apparatus to signal termination by the device of use of the identified resource, for causing the indicating means to indicate free status for the identified resource.

27. The lock of claim 26 wherein the apparatus further comprises:
means for preventing use of a resource by a device not having the grant of use of the resource.

28. The lock of claim 27 wherein the use preventing means comprise:
means for detecting attempted use of the resource by a device;
means responsive to the detecting means for determining whether the attempting device has the grant of use of the resource; and
means responsive to the grant determining means for signaling to the resource that the attempting device does not have the grant of use.

29. The lock of claim 26 wherein the apparatus further comprises:
means for counting the number of times a device uses the resource while having the grant of use, and for signaling to the resource when the count exceeds a predetermined limit.

30. The lock of claim 29, wherein the use of a resource includes a use of a first type and a use of a second type, and wherein the counting means only count the number of uses of the first type.

31. The lock of claim 26 wherein the plurality of devices include at least one processor.

32. The lock of claim 26 wherein the at least one shared resource includes a memory.

33. The lock of claim 32 wherein
a resource is identified to the apparatus by an address accompanying a memory READ command or a memory WRITE command, which address is associated by the apparatus with the resource, and
wherein the apparatus responds to devices, in response to READ and WRITE commands sent thereto, in like manner as the memory responds to devices, in response to memory READ and WRITE commands accompanied by memory addresses sent thereto for reading and writing the memory.

34. The lock of claim 26 wherein the status indicating means include:
at least one storage means, each associated with one resource for indicating the device having the grant of use of the associated resource.

35. The lock of claim 34 wherein the means for sending a response to the selected device include:
  means for sending a signal to the selected device when the storage means associated with the identified resource indicate no device.

36. The lock of claim 26 wherein the device selecting means include:
  at least one storage means, each associated with one resource for indicating the devices requesting use of the associated resource, and
  means for selecting a device from devices indicated by the storage means associated with a resource for using the associated resource.

37. A resource lock for a program controlled system which has a memory READ command and a memory WRITE command for reading and writing memory, respectively, by sending the command to memory, and which includes a plurality of identifiable devices each including means for sending a memory READ command accompanied by an address and for causing the device to wait for a response to the sent READ command before continuing operation and each further including means for sending a memory WRITE command accompanied by an address, and a memory coupled to the plurality of devices for use by the plurality of devices, the lock enabling the system to selectively treat the conventional memory READ and memory WRITE commands either as memory commands or as resource locking and unlocking requests, respectively, the lock comprising:
  an addressable apparatus for coupling to the plurality of devices and responsive to certain addresses reserved for memory in the system to limit concurrent use by a plurality of the devices of a set of memory portions comprising at least one portion of memory, including
  (1) first means for association with a memory portion included in the set to identify a device having the right to concurrently use the memory portion,
  (2) second means for association with the memory portion to identify devices requesting use of the memory portion,
  (3) means, responsive to a sent memory READ command accompanied by a certain address, for causing the second means to identify the device that is sending the command and the certain address to request use of the memory portion,
  (4) means, coupled to the second means, for selecting a device from devices identified by the second means,
  (5) means for sending a response to the memory READ command of the selected device when the first means do not identify a device, to grant the selected device the right to currently exclusively use the memory portion,
  (6) means, responsive to the response sent by the response-sending means to the selected device, for causing the first means to identify the selected device, and
  (7) means, responsive to a sent memory WRITE command accompanied by the certain address, sent by the device identified by the first means to signal its termination of use of the memory portion, for causing the first means to cease identifying the device.

38. The lock of claim 37 further comprising:
  third means for storing bounds of the memory portion;
  means, responsive to sending of a memory READ or WRITE command accompanied by an address, for comparing the address accompanying the command against the bounds stored in the third means and for comparing identity of the device sending the command and address against identity of the device identified by the first means; and
  means for signaling the memory when the comparing means indicate that the address lies within the bounds and that the compared identities are not the same.

39. The lock of claim 38 further comprising:
  resettable count storage means associated with the memory portion;
  means, responsive to sending of a memory WRITE command accompanied by an address, for updating the count storage means when the comparing means indicate that the address lies within the bounds and that the compared identities are the same;
  means for signaling the memory when the count storage means reach a predetermined count; and
  means, responsive to the response sent by the responding means to the selected device, for resetting the count storage means to an initial value.

40. The system of claim 37 wherein the plurality of devices include a plurality of processors.

* * * * *

UNITED STATES PATENT AND TRADEMARK OFFICE
CERTIFICATE OF CORRECTION

PATENT NO.   : 4,574,350
DATED        : March 4, 1986
INVENTOR(S)  : Daniel C. Starr It is certified that error appears in the above-identified patent and that said Letters Patent is hereby corrected as shown below:

Column 20, line 24, after "counting", "this" should be --the--.
Column 22, line 30, "applied" should be --coupled--.

Signed and Sealed this

Fourteenth Day of July, 1992

Attest:

DOUGLAS B. COMER

*Attesting Officer*     *Acting Commissioner of Patents and Trademarks*